3,354,147
SULFAMYL-MORPHANTHRIDINE-6,11-DIONES
Lincoln Harvey Werner, Summit, N.J., assignor to Ciba Corporation, New York, N.Y., a corporation of Delaware
No Drawing. Filed Nov. 5, 1965, Ser. No. 506,590
7 Claims. (Cl. 260—239.3)

The present invention concerns and has for its object the provision of sulfamyl-morphanthridine-6,11-diones, preferably such as the Formula I $$\begin{array}{c} CO \\ Ph_1 \diagup \diagdown Ph_2 \\ \diagdown CO-N \diagup \\ | \\ R \end{array} \quad (I)$$

in which each of $Ph_1$ and $Ph_2$ stands for a 1,2-phenylene radical, one of which carries a sulfamyl group and R for hydrogen or an aliphatic hydrocarbon or acyl radical, salts thereof as well as methods for the preparation of such compounds.

In the compounds of Formula I preferably $Ph_2$ contains the sulfamyl group, which especially is unsubstituted and located in the 2-position of the morphanthridine nucleus. It may, however, also be substituted, for example by lower aliphatic hydrocarbon and/or acyl radicals, such as lower alkyl and/or alkanoyl groups, e.g. methyl, ethyl, n-, or i-propyl, n-, i-, sec. or tert. butyl; formyl, acetyl, propionyl, butyryl or pivalyl.

Each of the 1,2-phenylene radicals $Ph_1$ and $Ph_2$ may otherwise be unsubstituted or substituted by one or more than one of the same or of different substituents attached at any position available for substitution. Such substituents are, for example, lower alkyl, such as that mentioned above, etherified or esterified hydroxy or mercapto, such as lower alkoxy or alkylmercapto e.g. methoxy, ethoxy, n-propoxy, or n-butoxy; methyl- or ethylmercapto, or halogeno, e.g. fluoro, chloro or bromo, trifluoromethyl, acyl, e.g. that mentioned above, nitro or amino, preferably tert. amino, such as di-lower alkylamino, e.g. dimethylamino or diethylamino.

An aliphatic hydrocarbon or acyl radical R preferably stands for lower alkyl or alkanoyl, e.g. that mentioned above.

The compounds of the invention exhibit valuable pharmacological properties. Apart from their antibacterial, antifungal and antiprotozoal activity, they show primarily diuretic effects, as can be demonstrated in animal tests using, for example, rats as test objects. They are, therefore, primarily useful as diuretic and natriuretic agents in order to relieve excessive water and/or salt retention, for example, in connection with heart and kidney diseases. Furthermore, they can be used as antibacterial, antifungal and antiprotozal agents, for example against microbacterium tuberculosis, histoplasma capsulatum or trichromonas vaginalis, but also as intermediates for other valuable products, preferably of pharmacologically active compounds.

Particularly valuable are compounds having the Formula II $$\begin{array}{c} O \quad SO_2NH_2 \\ R_2-\underset{O\;H}{\bigodot\!-\!N\!-\!\bigodot}-R_1 \end{array} \quad (II)$$

in which each of the radicals $R_1$ and $R_2$ stand for hydrogen, lower alkyl, lower alkoxy, halogeno, trifluoromethyl, amino and di-lower alkylamino.

Especially mentioned are compounds of the Formula III $$\begin{array}{c} O \quad SO_2NH_2 \\ R_4-\underset{O\;H}{\bigodot\!-\!N\!-\!\bigodot}-R_3 \end{array} \quad (III)$$

in which one of $R_3$ and $R_4$ stands for hydrogen and the other for hydrogen, methyl or chloro, which, when given orally to rats at doses between about 0.1 and 50 mg./kg., preferably between about 1 and 25 mg./kg., show outstanding diuretic and natriuretic effects.

The compounds of the invention are prepared according to methods known in the art. For example, they are obtained by (a) reacting the anthraquinone of the Formula IV $$\begin{array}{c} CO \\ Ph_1 \diagup \diagdown Ph_2 \\ \diagdown CO \diagup \end{array} \quad (IV)$$

with the compound $R-N_3$, or (b) condensing the carboxylic acids of the Formulae V to VII $$\begin{array}{ccc} \underset{Ph_1}{\overset{CO}{\diagup}}\!\diagdown\!\underset{COOH}{\overset{}{Ph_2}} & \underset{Ph_1}{\overset{COOH}{\diagup}}\!\diagdown\!\underset{NH-R}{\overset{H}{Ph_2}} & \underset{Ph_1}{\overset{H}{\diagup}}\!\diagdown\!\underset{CO-N-R}{\overset{HOOC}{Ph_2}} \\ (V) & (VI) & (VII) \end{array}$$

or a reactive functional derivative thereof, or (c) rearranging the phthalimide of the Formula VIII $$\begin{array}{c} CO \quad H \\ Ph_1 \diagup \diagdown N\!-\!Ph_2 \\ \diagdown CO \diagup \end{array} \quad (VIII)$$

in the presence of acidic condensing agents, or (d) oxidizing a compound of the Formula IX $$\begin{array}{c} X \\ Ph_1 \diagup \diagdown Ph_2 \\ \diagdown Y-N \diagup \\ | \\ R \end{array} \quad (IX)$$

in which X stands for methylene, hydroxymethylene or carbonyl and Y for methylene, or, in case X stands for methylene or hydroxymethylene, also for carbonyl or, in case R stands for a lower hydrocarbon radical, also for hydroxymethylene, or (a) reacting the sulfonic acid of the Formula X $$\begin{array}{c} CO \\ Ph_3 \diagup \diagdown Ph_4 \\ \diagdown CO-N \diagup \\ | \\ R \end{array} \quad (X)$$

in which each of $Ph_3$ and $Ph_4$ stands for a 1,2-phenylene radical, one of which carries a sulfo group, or a reactive functional derivative thereof, with ammonia or a lower aliphatic primary or secondary amine and, if desired, reacting any compound obtained, containing at least one hydrogen atom in the sulfamyl group and/or the 5-position, with a reactive functional derivative of an aliphatic alcohol or acid, hydrolyzing any N-acyl derivative obtained and/or converting any resulting free compound into a salt thereof or any resulting salt into the free compound or into another salt.

Reaction (a) is performed under the conditions known for the Schmidt reaction, advantageously under acidic conditions and the use of hydrazoic acid or acylazides.

The condensation shown under (b) may be carried out either with the use of the free acids and advantageously in the presence of a dehydrating agent, such as sulfuric or polyphosphoric acid, or with the use of corresponding functional acid derivatives, for example the acid halides. In the compounds of Formula V, R preferably stands for hydrogen or an aliphatic hydrocarbon radical, whereas R in Formula VI preferably stands for an aliphatic hydrocarbon or acyl radical. In case R stands in Formula V for an aliphatic acyl radical, this is usually lost in the course of the reaction due to hydrolytic conditions. In case R stands in Formula VI for hydrogen, predominantly phthalimides of the Formula VIII are formed. These, however, rearrange according to reaction (c) under acidic conditions, especially in the presence of Lewis acids, such as aluminum or zinc chloride, to the desired compounds of the invention.

The oxidation according to (d) is easily to perform in the case X and/or Y stand for a hydroxymethylene group, for example with the use of inorganic or organic oxidation agents useful in the oxidation of alcohols, such as chromic acid, potassium permanganate, nitric acid or ferric chloride, or according to the Oppenauer method. The oxidation of a methylene group usually requires stronger oxidation agents, such as lead tetraacetate, selenium dioxide or nitrogen oxides.

The amidation according to (e) advantageously is carried out with the use of reactive functional derivatives of the sulfonic acids of the Formula X, especially the halides thereof. The free acids may be converted into the corresponding ammonium salts which are dehydrated to the sulfonamides, for example by pyrolysis.

In the optional reaction with a reactive functional derivative of an aliphatic alcohol or acid, advantageously lower alkyl or alkanoyl halides are used. The hydrolysis of an N-acyl derivative obtained may be carried out with the use of aqueous acids, such as aqueous hydrochloric acid.

The starting materials used in the present invention are known or, if they are new, may be prepared according to methods known per se. The anthraquinones shown under (a) can be prepared by sulfonylation or halosulfonylation of the corresponding anthraquinones containing no sulfamyl group. Any sulfonic acid obtained, analogoulsy to reaction (d), may either be converted into the corresponding ammonium salt which is then dehydrated, or converted into a sulfonic acid halide, for example with the use of thionyl chloride or phosphorus pentachloride, which is then reacted with ammonia or the corresponding amine. The carboxylic acids of Formula V may be obtained according to Ber. 70, 1952 (1937), those of Formula VI by reaction of phthalic acid anhydrides with corresponding anilines containing in at least one ortho-position a hydrogen atom and those of Formula VII by reaction of anthranilic acids with a benzoic acid halide containing in at least one ortho-position a hydrogen atom. The starting material of Formula VIII can be prepared analogous to the procedure given in German Patent No. 551,256 (1932). That of Formula IX may be obtained by Beckmann rearrangement of the oximes of corresponding anthrones, furthermore by cyclization of corresponding (2-carboxy-phenyl)-(2-amino-phenyl)-carbinols according to reaction (b) using the acids of Formula V, or by cyclization of corresponding (2-formyl-phenyl)-(2-amino-phenyl)-carbinols; in the course of their preparation the 2-carboxyl group may suitably be esterified and the 2-formyl group acetalized. The starting material of Formula X may be obtained according to one of the procedures (a) to (d) using corresponding starting materials which contain instead of $Ph_1$ and $Ph_2$ the phenylene radicals $Ph_3$ and $Ph_4$, or by diazotisation of an aminomorphanthridine-6,11-dione and reaction of the diazonium salt, such as the diazonium chloride, with a solution of sulfur dioxide in acetic acid containing cupric chloride as the catalyst.

The above reactions are performed according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The compounds of the invention as well as the starting materials are obtained in the free form or in the form of their salts, depending on the acidic or basic character of the compounds or the conditions under which the process is carried out, the salts are also included in the present invention. Compounds that contain acid groups form metal salts, particularly alkali metal, such as sodium or potassium salts. Basic compounds form acid addition salts, which are preferably derived from therapeutically useful inorganic or organic acids, such as hydrohalic acids, e.g. hydrochloric or hydrobromic acid, sulfuric, phosphoric, nitric or perchloric acid, aliphatic, alicyclic, aromatic or heterocyclic carboxylic or sulfonic acids, for example, formic, acetic, propionic, succinic, glycollic, lactic, malic, trataric, citric, ascorbic, maleic, hydroxymaleic, pyroracemic, phenylacetic, benzoic, p-aminobenzoic, anthranilic, p-hydroxybenzoic, salicylic, p-aminosalicylic, embonic, methanesulfonic, ethanesulfonic, hydroxyethanesulfonic, ethylenesulfonic, halobenzenesulfonic, toluenesulfonic, naphthalenesulfonic or sulfanilic acid, methionine, tryptophane, lysine or arginine. The conversion of the free compound into the salts or of the salts into the free compounds or into other salts is achieved according to standard procedures, for example with the use of acidic or alkaline agents or ion exchangers.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. Mainly those starting materials should be used in the reactions of the invention that lead to the deformation of those compounds indicated above as being especially valuable.

The compounds of the invention may be used in the form of pharmaceutical compositions which are a further object of present invention. They contain said compounds in admixture with organic or inorganic, solid or liquid pharmaceutical excipients suitable especially for enteral administration. Suitable excipients are substances that do not react with the new compounds, for example water, gelatine, lactose, starch, stearyl alcohol, magnesium stearate, talc, vegetable oils, benzyl alcohol, gums, propylene glycol and other known medicinal excipients. The compositions may be, for example, tablets or pills, or in liquid form as solutions, suspensions or emulsions. They may be sterilized and/or contain adjuvants such as preserving, stabilizing, wetting or emulsifying agents, solution promoters, salts for regulating the osmotic pressure or buffers. They may also contain other therapeutically valuable substances as described in copending application Ser. No. 463,396, filed June 11, 1965. These compositions are prepared by conventional methods.

The following examples illustrate the invention, temperatures are given in degrees centigrade and all parts wherever given are parts by weight.

Example 1

10.0 g. morphanthridine-6,11-dione-2-sulfonyl chloride are added to 100 ml. of 28% aqueous ammonium hydroxide and the resulting mixture is heated on the steam bath for 1 hour. After cooling to room temperature it is filtered and the residue recrystallized twice from dimethylformamide to yield the morphanthridine-6,11-dione-2-sulfonamide of the formula

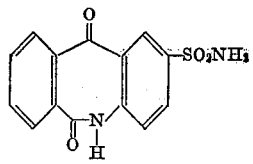

melting at 298–300°.

The starting material is prepared as follows: 11.2 g. morphanthridine-6,11-dione are added to 20 ml. chlorosulfonic acid while cooling. This is followed by portionwise addition of 17.5 g. sodium chloride. The reaction mixture is then heated in an oil bath to 160° for three hours. After allowing to cool to room temperature the contents of the flask are cautiously treated with ice and water. The crude morphanthridine-6,11-dione-2-sulfonyl chloride is filtered off and used as such without further purification.

*Example 2*

Substituting the morphanthridine-6,11-dione in Example 1 by 11.9 g. of 3-methyl-morphanthridine-6,11-dione and proceeding as described therein, there is obtained the 3-methyl - morphanthridine - 6,11-dione-2-sulfonamide of the formula

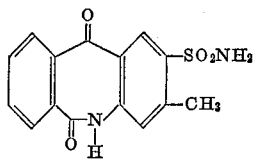

which melts after one recrystallization from dimethylformamide/ethanol at 279–281° with decomposition.

*Example 3*

Substituting the morphanthridine-6,11-dione in Example 1 by 11.9 g. of 8-methyl-morphanthridine-6,11-dione and proceeding as described therein the 8-methyl-morphanthridine-6,11-dione-2-sulfonamide of the formula

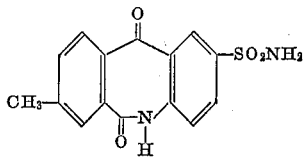

is obtained which melts after two recrystallizations from dimethylformamide/ethanol at 238° with decomposition.

*Example 4*

11.5 g. 8-chloro-morphanthridine-6,11-dione-2-sulfonyl chloride are added to 100 ml. of 28% aqueous ammonium hydroxide and the mixture is heated on the steam bath for 1 hour. After cooling to room temperature, it is filtered, the residue dissolved in 70 ml. dimethylformamide, the solution decolorized with charcoal and diluted with 210 ml. ethanol, to yield a first crop of crystals melting at 320° which is discarded. The mother liquor is concentrated in vacuo and the remaining solution diluted with ethanol to yield the desired 8-chloro-morphanthridine-6,11-dione-2-sulfonamide of the formula

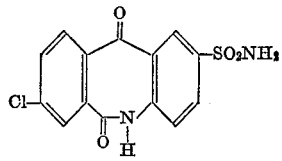

melting after recrystallization from dimethylformamide/ethanol at 255°.

The starting material is prepared according to the method shown in Example 1, by replacing the morphanthridine-6,11-dione used therein by 12.9 g. 8-chloro-morphanthridine-6,11-dione.

*Example 5*

In the analogous manner described in the previous examples the following compounds are prepared from equivalent amounts of the corresponding starting materials:

3-chloro-morphanthridine-6,11-dione-2-sulfonamide,
1-methoxy-morphanthridine-6,11-dione-2-sulfonamide,
9-trifluoromethyl-morphanthridine-6,11-dione-2-sulfonamide,
3-amino-morphanthridine-6,11-dione-2-sulfonamide,
8-dimethylamino-morphanthridine-6,11-dione-2-sulfonamide,
3,8-dimethyl-morphanthridine-6,11-dione-2-sulfonamide,
3-methyl-8-chloro-morphanthridine-6,11-dione-2-sulfonamide,
3-methoxy-9-methyl-morphanthridine-6,11-dione-2-sulfonamide,
4,7-dimethoxy-morphanthridine-6,11-dione-2-sulfonamide or
1-methoxy-8-chloro-morphanthridine-6,11-dione-2-sulfonamide.

What is claimed is:
1. A member selected from the group consisting of a sulfamyl-morphanthridine-6,11-dione having the formula

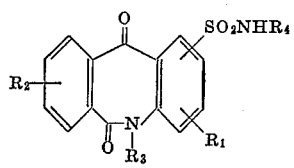

in which each of $R_1$ and $R_2$ is a member selected from the group consisting of hydrogen, lower alkyl, lower alkoxy, lower alkylmercapto, halogeno, trifluoromethyl, lower alkanoyl, nitro and di-lower alkylamino and each of $R_3$ and $R_4$ is a member selected from the group consisting of hydrogen, lower alkyl and lower alkanoyl, the alkali metal salts of the compounds in which at least one of $R_3$ and $R_4$ is hydrogen and the therapeutically useful acid addition salts of the compounds in which at least one of $R_1$ and $R_2$ is di-lower alkylamino.

2. A compound as claimed in claim 1 and having the formula

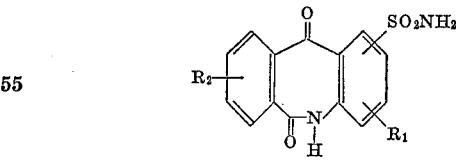

in which each of the radicals $R_1$ and $R_2$ stands for a member selected from the group consisting of hydrogen, lower alkyl, lower alkoxy, halogeno, trifluoromethyl, amino and di-lower alkylamino.

3. A compound as claimed in claim 1 and having the formula

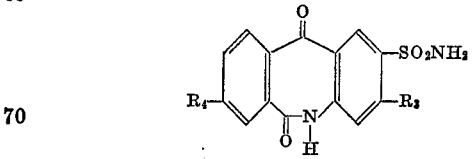

in which one of $R_3$ and $R_4$ stands for hydrogen and the other for a member selected from the group consisting of hydrogen, methyl and chloro.

4. A compound as claimed in claim 1 and being the morphanthridine-6,11-dione-2-sulfonamide.

5. A compound as claimed in claim 1 and being the 3-methyl-morphanthridine-6,11-dione-2-sulfonamide.

6. A compound as claimed in claim 1 and being the 8-methyl-morphanthridine-6,11-dione-2-sulfonamide.

7. A compound as claimed in claim 1 and being the 8-chloro-morphanthridine-6,11-dione-2-sulfonamide.

References Cited

UNITED STATES PATENTS 2,973,354   2/1961   Werner _____ 260—239.3

JOHN D. RANDOLPH, *Primary Examiner.*

R. BOND, *Assistant Examiner.*